United States Patent
Brodbeck et al.

(10) Patent No.: US 10,338,544 B2
(45) Date of Patent: Jul. 2, 2019

(54) COMMUNICATION CONFIGURATION ANALYSIS IN PROCESS CONTROL SYSTEMS

(71) Applicant: ABB TECHNOLOGY AG, Zurich (CH)

(72) Inventors: Heinz Brodbeck, Hüntwangen (CH); Wolfgang Wimmer, Rietheim (CH)

(73) Assignee: ABB Schweiz AG, Baden (CH)

( * ) Notice: Subject to any disclaimer, the term of this patent is extended or adjusted under 35 U.S.C. 154(b) by 677 days.

(21) Appl. No.: 14/630,033

(22) Filed: Feb. 24, 2015

(65) Prior Publication Data
US 2015/0227126 A1 Aug. 13, 2015

Related U.S. Application Data

(63) Continuation of application No. PCT/EP2013/066816, filed on Aug. 12, 2013.

(30) Foreign Application Priority Data
Aug. 24, 2012 (EP) .................................. 12181615

(51) Int. Cl.
G05B 15/02 (2006.01)
H04L 29/08 (2006.01)
(Continued)

(52) U.S. Cl.
CPC ........ *G05B 15/02* (2013.01); *H04L 29/08558* (2013.01); *H04L 41/0631* (2013.01);
(Continued)

(58) Field of Classification Search
None
See application file for complete search history.

(56) References Cited

U.S. PATENT DOCUMENTS

2009/0076762 A1* 3/2009 Vetter .................. H04L 43/028
702/122
2009/0300165 A1 12/2009 Tuckey et al.
(Continued)

FOREIGN PATENT DOCUMENTS

CN 101491028 A 7/2009
CN 101540773 A 9/2009
(Continued)

OTHER PUBLICATIONS

Feb. 24, 2015 International Preliminary Report on Patentability issued in PCT/EP2013/066816.
(Continued)

*Primary Examiner* — Philip J Chea
*Assistant Examiner* — Hassan A Khan
(74) *Attorney, Agent, or Firm* — J. Bruce Schelkopf; Taft Stettinius & Hollister LLP

(57) ABSTRACT

The present invention is concerned with Process Control systems including a client IED and a plurality of server IEDs connected to an Ethernet communication network. A protocol analyzer tool connected to the communication network captures messages directed to the client IED and assigns, from a standardized configuration representation of the PC system comprising the logical data flow definitions, a server or source IED to each captured message. A client IED independent way of diagnosing a cause of client overload problems is provided by analyzing statistically the captured messages. Such statistical approach allows identifying any operating server or source IED sending, on average, more messages than during a preceding period or more messages than calculated.

6 Claims, 1 Drawing Sheet

(51) Int. Cl.
*H04L 29/06* (2006.01)
*H04L 12/26* (2006.01)
*H04L 12/24* (2006.01)

(52) U.S. Cl.
CPC .......... *H04L 43/065* (2013.01); *H04L 43/067* (2013.01); *H04L 67/10* (2013.01); *H04L 67/12* (2013.01); *H04L 67/42* (2013.01); *Y04S 40/166* (2013.01); *Y04S 40/168* (2013.01); *Y04S 40/18* (2018.05)

(56) References Cited

U.S. PATENT DOCUMENTS

| | | | |
|---|---|---|---|
| 2010/0039954 A1* | 2/2010 | Wimmer | H04L 41/0853 370/252 |
| 2010/0040068 A1* | 2/2010 | Wimmer | H04L 41/08 370/395.53 |
| 2011/0047264 A1* | 2/2011 | Hilpert | H04L 41/145 709/224 |
| 2013/0031037 A1* | 1/2013 | Brandt | H04L 63/1408 706/12 |
| 2013/0031340 A1* | 1/2013 | Carrara | H04L 41/0803 713/1 |
| 2014/0025321 A1* | 1/2014 | Spanier | G01R 21/133 702/62 |
| 2014/0328213 A1* | 11/2014 | Obrist | H04L 43/028 370/254 |

FOREIGN PATENT DOCUMENTS

| | | | |
|---|---|---|---|
| EP | 1850447 | A1 | 10/2007 |
| EP | 2109204 | A1 | 10/2009 |
| EP | 2157731 | A1 | 2/2010 |
| EP | 2157732 | A1 | 2/2010 |
| EP | 2288080 | A1 | 2/2011 |

OTHER PUBLICATIONS

European Search Report dated Jan. 22, 2013, for European Application No. 12181615.1.
T.S. Sidhu et al., IED Modelling for IEC61850 Based Substation Automation System Performance Simulation, 2006 IEEE Power Engineering Society General Meeting, Jun. 18-22, 2006, Montreal, Quebec, Canada, Piscataway, NJ, USA, pp. 1-7.
Jittiwut Suwatthikul et al., Adaptive OSEK Network Management for In-vehicle Network Fault Detection, pp. 1-6.
Translation of Decision on Rejection Issued by the Chinese Patent Office dated Sep. 21, 2018; Chinese Application No. 201380044405.9; Applicant: ABB Schweiz AG; 10 pgs.
Translation of Search Report Issued by the State Intellectual Property Office of People's Republic China dated Feb. 19, 2017; Chinese Application No. 201380044405.9; Applicant: ABB Technology AG; 2 pgs.
Translation of First Chinese Office Action Issued by the State Intellectual Property Office dated Feb. 28, 2017; Chinese Application No. 201380044405.9; Applicant: ABB Technology AG; 10 pgs.
Translation of Second Chinese Office Action Issued by the State Intellectual Property Office dated Nov. 6, 2017; Chinese Application No. 201380044405.9; Applicant: ABB Technology AG; 10 pgs.
Translation of Third Chinese Office Action Issued by the State Intellectual Property Office dated May 9, 2018; Chinese Application No. 201380044405.9; Applicant: ABB Schweiz AG; 14 pgs.

* cited by examiner

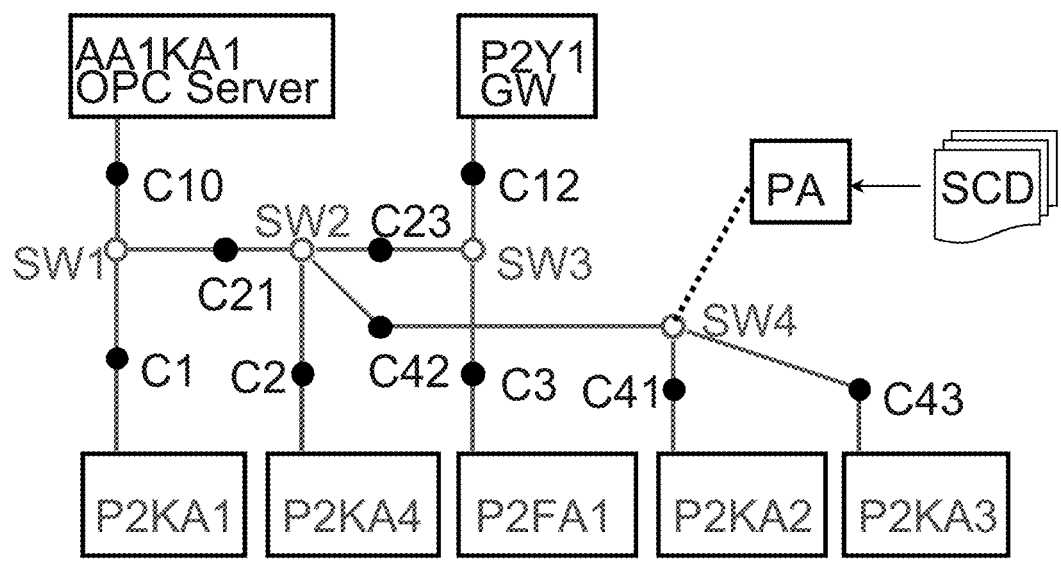

COMMUNICATION CONFIGURATION ANALYSIS IN PROCESS CONTROL SYSTEMS

FIELD OF THE INVENTION

The invention relates to the field of Process Control, and in particular to Substation Automation. Specifically it relates to analysis of a communication configuration of a Process Control system with a standardized configuration representation.

BACKGROUND OF THE INVENTION

Substations for power distribution in high and medium voltage power networks include primary or field devices such as electrical cables, lines, bus bars, switches, breakers, power transformers and instrument transformers arranged in switch yards and/or bays. These primary devices are operated in an automated way via a Substation Automation (SA) system responsible for controlling, protecting and monitoring of substations. The SA system comprises programmable secondary devices, so-called Intelligent Electronic Devices (IED), interconnected in a SA communication network, and interacting with the primary devices via a process interface.

SA systems require interoperability between all IEDs independent of the manufacturer. Therefore, the IEC standard 61850 "communication networks and systems in substations" has been introduced. An abstract data model according to the standard incorporates SA functionality in terms of logical nodes grouped into logical devices and allocated to the IEDs as the physical devices. The communication-specific issues are handled via an ISO/OSI communication stack comprising a stack with MMS/TCP/IP/Ethernet and an optical, wireless or other media-type physical layer. While the data model including attributes like time stamps or validity indications is realized by the application layer of the communication stack, messages for time-critical or safety-related communication, i.e. the Generic Object Oriented Substation Events (GOOSE) such as trips and blockings, as well as for analogue Sampled Values (SV), are mapped directly to the Ethernet link layer of the communication stack.

A complete SA system with its entire devices and communication links may be described in a formal way in the engineering process by means of the comprehensive XML-based Substation Configuration description Language (SCL) for IEC 61850 compliant systems. The SCL language is used to describe the capabilities of a particular IED type in an IED Capability Description (ICD). It enumerates the communication and application functionality of the physical device as delimited e.g. by the number of I/O ports. A Substation Configuration Description (SCD) file in SCL language is a standardized configuration representation of the SA system and describes a model of a particular substation, the IED functions in terms of logical nodes, and the communication connections.

An SCD file includes the logical data flow between the IEDs in the form of control blocks specifying, for each message type or corresponding message source/service class, the receiver or intended destination IEDs, the message size in terms of data set definitions, as well as the message sending rates for all periodic traffic like GOOSE, SV and Integrity reports. Based on this information and by adding for event based reports a normal state data change rate, e.g. one changed value per second and control block, as well as a burst change size, e.g. five messages per event related control block, an average normal load as well as load peaks can be calculated for each receiver IED.

The above is used to advantage in the patent application EP-A 2157731. From a logical data flow description that is part of a standardized configuration representation of a SA system and which includes, in the form of control blocks, formal information for every message, receiver IEDs are retrieved or determined. For each retrieved receiver IED, the totality of all network messages destined for or directed to this particular receiver IED is evaluated or processed, e.g. in view of a subsequent network load analysis, Virtual Local Area Network assignment, or graphical display of the data flow. The process is applied to engineered SA systems and thus unable to detect hardware failures that may result in broadcasting of excessive message rates or configuration errors that are only introduced during installation or commissioning when configuration information previously engineered is transferred to the IEDs. Hardware failure and configuration inconsistencies between the SCD file and the actual configuration of an individual IED should be identified and remedied during or after a commissioning of an SA system.

A mere size aspect adds to the aforementioned configuration inconsistency issues. For large process control systems with increased real time critical communication needs due to multicast communication traversing the entire system, the communication network load becomes critical. Furthermore, engineers from different parties independently configuring data servers may not be aware of the communication needs and restrictions of the respective clients, and generally have no focus on the complete system communication load. This is especially true for multicast GOOSE and SV messages according to IEC 61850, and has an impact on the entire communication system as well as on individual message receivers. Hence completeness and/or correctness of the data flow definitions, particularly in process control systems with up to 500 IEDs communicating among each other, are not easily verified. In this context, the principles and methods of the following invention are by no means restricted to a use in substation automation, but likewise applicable to other process control systems with a standardized configuration description. In particular, it has to be noted that IEC 61850 is also an accepted standard for Hydro power plants, Wind power systems, and Distributed Energy Resources (DER).

As mentioned, IEC 61850 based process control systems offer, in addition to the standardized communication based on Ethernet and for some service types on TCP/IP, a standardized description of the data models and communication definitions inside all server IEDs based on SCL. Furthermore the standardized description also allows relating all IP addresses to client IEDs, even if the latter do not support directory services for data model and logical device name discovery. On the other hand, within such kinds of communication systems clients risk to be overloaded to an extent preventing them from processing any further incoming data.

The reasons for this may be manifold and include hardware faults in the system generating excessive messages, as well as, most prominently, inconsistent or wrong configuration of the servers concerning the client functionality. Although the effects caused by the communication overload at the receiver can be immediately observed, it is not easy to diagnose the cause. If communication problems arise, special communication diagnostic facilities implemented in each client may be enabled. The latter however are client specific and rely on specific knowledge of the client IED type.

Alternatively a protocol analyser may be used to collect and analyse communication traffic. With the growing dependency on Ethernet communication between IEDs and other devices in a substation, tools have been developed that allow for analysis of the network traffic, i.e. basic Ethernet and related TCP/IP traffic, being exchanged in a SA network. A few of these (mms-ethereal, KEMA Analyzer) allow to further analyse standard Ethernet traffic and extract 61850 relevant data packets such as Sampled values, GOOSE, MMS etc. from the messages. However, there is no possibility for an operator to understand the context of this extracted data, i.e. to give it a correct meaning.

The patent application EP-A 1 850 447 describes a Substation Automation testing tool which combines protocol semantics information found in the SCL (Substation Configuration Language) File of a substation (Substation Configuration Description) or an IED (IED Capability description) with substation-relevant data extracted from the Substation Communication network traffic. By means of a standard laptop computer as a message interceptor connected to a substation communication network, IEC 61850 relevant data is retrieved and analysed, allowing for consistency verification without revision handling.

The patent application EP-A 2 288 080 is concerned with an analysis of a communication stack performance of an IED in a communication network of a SA system. A plurality of application level scenario corresponding to a high communication load on the IED is executed by means of a message synthesizer. Among all network messages intercepted during scenario execution, those network messages destined to the IED and sent by the IED in response are identified. An IED-intrinsic processing time of the identified messages is likewise determined, based on which parameter values of an IED processing time model for a specific communication service are calculated.

DESCRIPTION OF THE INVENTION

It is an objective of the invention to reduce time and efforts for commissioning and testing of communication networks of Process Control (PC) or Substation Automation (SA) systems with a plurality of Intelligent Electronic Devices (IEDs). This objective is achieved by a method and a device according to the independent claims. Preferred embodiments are evident from the dependent patent claims.

According to the invention, a PC system including a client or receiver IED and a plurality of server or sender IEDs connected to an Ethernet communication network is analysed. A protocol analyser tool connected to the communication network at a strategic location in the vicinity of the client IED captures or intercepts messages directed to the client IED and assigns, from a standardized configuration representation of the PC system comprising the logical data flow definitions, a server or source IED to each captured and identifiable message. The analyser determines a present or updated number of messages per unit of time received by the client IED from a specific server IED. The analyser then compares this time average against an expected or base number of messages per unit of time to identify, in case of significant discrepancies between the two numbers, the specific server IED as a source of excessive message rates due to server IED configuration and/or hardware abnormalities. The protocol analyser tool may even record or collect all network traffic for a certain time and proceed to a subsequent batch analysis or evaluation according to later-defined filter criteria.

In other words, a client IED independent way of diagnosing a cause of client overload problems is provided by mapping, based on protocol semantics, messages collected during presumed regular operation of the PC system by a protocol analyser tool and by analysing statistically the mapped data. Such statistical approach allows identifying any operating server or source IED sending, on average, more messages than other IEDs, or sending more messages than originally calculated. By consulting control block configuration data according to IEC 61850 and the data set contents, any misconfiguration can be immediately identified and subsequently remedied by, for instance, changing the cycle time, or by moving from event-based reporting to cyclic reporting.

The analyzer tool is initially employed during commissioning of a PC or SA project, but may be repeatedly involved at any later time, especially during a warranty period. Hence the tool is able to detect configuration errors that are only introduced during installation or commissioning and that result in broadcasting of excessive message rates. The inventive approach can also be used to identify IEDs with a hardware fault, as long as the sender identification in the wrongly sent messages is still correct.

In a preferred variant of the invention, the expected or reference number of messages is a number of messages of the same message type, and/or controlled by the same control block according to IEC 61850, received previously by the client IED per unit of time. Alternatively the expected or reference number of messages is an average number of messages calculated based on message sending frequency information in connection with the standardized configuration representation of the PC system. Alternatively, the analyser may count all messages received by the client IED per unit of time, and separately establish a sum of those messages received the client IED that have an identifiable sender according to the standardized configuration representation of the PC system. Any difference between the two numbers is assigned to some non-protocol server that does not adhere to the standardized configuration representation of the PC.

In an advantageous embodiment of the invention, the PC system is a Substation Automation SA system and the standardized configuration representation comprising the logical data flow definitions is a Substation Configuration Description SCD of the SA system according to IEC 61850. The SCD includes message control blocks with client and server Logical Device LD and corresponding message type information. The analyser determines a present number of messages of a specific message type per unit of time received by a client LD from a server LD, and compares the present number against an expected number of messages to identify the server LD or even a specific service or process data object on the server LD as a source of excessive message rates. A minimum length of a few minutes of an observation time interval adequately accounts for occasional message bursts and enables meaningful statistical evaluation. Comparing sequential message rates allows detecting slowly decreasing performance due to missing VLAN filters for Generic Object Oriented Substation Events (GOOSE) and analogue Sampled Values (SV) traffic in the SA system.

The present invention also relates to a computer program product including computer program code for controlling one or more processors of an analyser adapted to be connected to a communication network and/or configured to store a standardized configuration representation, particularly, a computer program product including a computer readable medium containing therein the computer program code.

BRIEF DESCRIPTION OF THE DRAWINGS

The subject matter of the invention will be explained in more detail in the following text with reference to preferred exemplary embodiments which are illustrated in the attached drawings, in which:

FIG. 1 depicts the physical network structure of a communication network.

DETAILED DESCRIPTION OF PREFERRED EMBODIMENTS

FIG. 1 shows a communication network structure of an exemplary Substation Automation (SA) system. Shown are switches (open circles), cables (dots), and Intelligent Electronic Devices (IEDs) (rectangles). The switches SW1, SW2, SW3, and SW4 are connected to the IEDs (OPC server AA1KA1 and Gateway P2Y1 on station level; IEDs P2KA1, P2KA4, P2FA1, P2KA2, P2KA3 on bay level) with cables C1, C2, C3, C41, C43, C10, C12, and among themselves with trunk cables C21, C23, C42. During commissioning of the substation, a laptop computer as protocol analyser PA is connected to the SA communication network or inter-bay bus at switch SW4. The PA has access to a Substation Configuration Description (SCD) file of the SA system.

One type of communication in modern SA systems is based on a publisher—subscriber model using multicast Ethernet frames. Thus, any client, including analyser PA, connected to the network will, if configured accordingly, receive all GOOSE information. Tools have been developed that allow for analysis of the network traffic, i.e. basic Ethernet and related TCP/IP traffic, being exchanged in a SA network. In order to produce a human readable form including relevant context of extracted data, the analysis of the extracted data comprises an interpretation with the help of the description found in the SCD or ICD file. Enhanced information thus generated relates e.g. to the specific data type or format of a piece of data extracted, i.e. whether a particular numerical value is represented in Integer, String or hexadecimal format. The information may also reveal the semantic meaning of the value and indicate e.g. a switch position or any other attribute that has to be known or set for a proper operation of the substation automation system.

The following table reports exemplary calculated and measured message occurrence summed for each IED of FIG. 1 as client. Every line may further be expanded to LD or source control block comprising calculated and measured sent messages. As is evident from the closely matching message rate numbers, no discrepancy is found.

| IED ID | IED Type | Expected load In msg/s | Measured load In msg/s |
|---|---|---|---|
| Station level IEDs | | | |
| AA1KA1 | OPC Server | 5 | 6 |
| P2Y1 | COM581 | 5 | 4 |
| Bay level IEDs | | | |
| P2KA1 | RE.316 | 8 | 8 |
| P2KA4 | RE.316 | 8 | 7 |
| P2FA1 | RE.316 | 8 | 8 |

-continued

| IED ID | IED Type | Expected load In msg/s | Measured load In msg/s |
|---|---|---|---|
| P2KA2 | Areva | 8 | 8 |
| P2KA3 | Siemens | 8 | 9 |

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of analysing a Process Control (PC) system including a client Intelligent Electronic Device (IED) and server IEDs connected to a communication network, wherein an analyser connected to the communication network captures messages directed to the client IED and assigns a server IED to a captured message based on a standardized configuration representation of the PC system including logical data flow definitions, the method comprising:
determining a present number of messages per unit of time received by the client IED from a server IED;
comparing the present number against an expected number of messages to identify the server IED as a source of excessive message rates; and
remedying a misconfiguration identified by comparing the present number against the expected number of messages, wherein remedying the misconfiguration comprises changing a reporting cycle time or moving from event-based reporting to cyclic reporting.

2. The method of claim 1, wherein the expected number of messages includes a previous number of messages received by the client IED per unit of time, or a calculated average number of messages.

3. The method of claim 1, wherein the PC system is a Substation Automation (SA) system and wherein the standardized configuration representation including the logical data flow definitions is a Substation Configuration Description (SCD) according to IEC 61850 including client and server Logical Device (LD) and message type, the method comprising:
determining a present number of messages of a message type per unit of time received by a client LD from a server LD; and
comparing the present number against an expected number of messages to identify the server LD as a source of excessive message rates.

4. A computer with a non-transitory medium for storing a computer program for analysing a Process Control (PC) system having a client Intelligent Electronic Device (IED) and server IEDs connected to a communication network, wherein the computer is connected to the communication network and upon execution the computer captures messages directed to the client IED, the computer being configured to:
- assign a server IED to a captured message based on a standardized configuration representation of the PC system including the logical data flow definitions;
- determine a present number of messages per unit of time received by the client IED from a server IED;
- compare the present number against an expected number of messages to identify the server IED as a source of excessive message rates; and
- change a reporting cycle time or moving from event-based reporting to cyclic reporting to remedy a misconfiguration identified by a comparison of the present number against the expected number of messages.

5. The method of claim 3, wherein the expected number of messages includes a previous number of messages received by the client IED per unit of time, or a calculated average number of messages.

6. The computer according to claim 4, in combination with:
- a process control system having a client IED and server IEDs connected to the communication network to capture messages directed to the client IED.

* * * * *